United States Patent

Gray et al.

[15] 3,694,574

[45] Sept. 26, 1972

[54] ELECTROSTATIC FACSIMILE PRINTER

[72] Inventors: Thomas J. Gray, Halifax, N. S., Canada; John B. Picchiottino; Kenneth R. Hackett, both of Boulder, Colo.

[73] Assignee: Phonocopy, Inc., Wilmington, Del.

[22] Filed: Sept. 16, 1969

[21] Appl. No.: 858,297

[52] U.S. Cl..........178/6.6 A, 346/74 ES, 346/139 A, 346/139 C

[51] Int. Cl........G01d 15/06, H04n 1/14, H04n 1/30

[58] Field of Search................178/6.6 A, 6.6, 6.6 R; 346/74 E, 74 ES, 139 A, 139 C

[56] References Cited

UNITED STATES PATENTS

| | | | |
|---|---|---|---|
| 3,419,884 | 12/1968 | Betts et al. | 346/74 ES |
| 3,419,888 | 12/1968 | Levy | 446/74 ES |
| 2,879,129 | 3/1959 | Alden | 346/74 E |
| 2,978,288 | 4/1961 | Zabriskie et al. | 346/74 E |
| 3,166,752 | 1/1965 | Waterman | 346/74 E |
| 3,369,250 | 2/1968 | Gifft | 178/6.6 R |

*Primary Examiner*—Howard W. Britton
*Assistant Examiner*—Steven B. Pokotilow
*Attorney*—Chittick, Pfund, Birch, Samuels & Gauthier

[57] ABSTRACT

A flatbed printer for facsimile reproduction provides a scan line station across which a record sheet moves and one or more scanning styli which scan the record sheet line by line as it moves across the scan line station with substantially rectilinear motion. The stylus is transported by a belt driven on two-spaced rotatable pulleys which permits a flatbed configuration with electrodes and supporting structure adapted to permit the formation of a charge image as the styli scan the record sheet and preserve the charge image during subsequent travel to a toner electrostatic developing station where a permanent visible image is produced.

2 Claims, 9 Drawing Figures

INVENTORS
THOMAS J. GRAY
JOHN B. PICCHIOTTINO
KENNETH R. HACKETT

BY

Chittick, Pfund, Birch, Samuels & Gauthier
ATTORNEYS

INVENTORS

THOMAS J. GRAY
JOHN B. PICCHIOTTINO
BY KENNETH R. HACKETT

Chittick, Pfund, Birch, Samuels & Gauthier
ATTORNEYS

INVENTORS
THOMAS J. GRAY
JOHN B. PICCHIOTTINO
KENNETH R. HACKETT
BY
Chittick, Pfund, Birch, Samuels & Gauthier ATTORNEYS

ELECTROSTATIC FACSIMILE PRINTER

BACKGROUND OF THE INVENTION

This invention relates to facsimile printers and particularly to flatbed printers which employ scanning styli which move in substantially linear motion across a slowly progressing record sheet to reconstitute the desired image by means of a line by line scan of the total area of the record sheet. Facsimile printers employing the mechanical scanning elements of this type are known in the prior art, for example, as shown in Ser. No. 579,584 now U.S. Pat. No. 3,502,814, assigned to the assignee of the present invention.

While electrostatic scanning printers have heretofore been known in the art, for example, the patent to Adams et al. U.S. Pat. No. 2,932,690, no previous arrangements for electrostatic printing of a full-size page with arrangements for forming and maintaining an accurate charge image during a rectilinear scan process and maintaining the image while the record sheet is transported to a developing station with provision for both minimizing unwanted charges of the type present where high-speed motion of a belt is present and an electrode system which permits preservation of the charge image as it is transported for subsequent development in a developing station remote from the scanning station has been provided.

SUMMARY OF THE INVENTION

The present invention provides the mechanical arrangement of a flatbed printer with a belt transport for a scanning stylus in a confirguration which produces a mechanically precise scan motion giving line by line reconstruction of a facsimile image over a full-size page with the scanning taking place in substantially rectilinear motion. Scanners of the flatbed type have the advantage of relatively simple paper feed and continuous processing of paper through the scanning position while maintaining a low profile for the overall machine primarily because a rotary drum is not required to support the record sheet in any portion of its travel. In this environment the present invention provides a paper drive and support and stylus scan construction which preserves the necessary mechanical accuracy of the relative motion and alignment of the moving parts relative to the record sheet while at the same time developing an accurate charge-forming zone which can be modulated by the facsimile signal to produce a precise charge image replica of the original document scanned at the facsimile transmitter. This charge image is formed and maintained by minimizing unwanted static electricity effects due to the motion of the scanning belt and preserving the charge by supporting the charge bearing surface of the record sheet in a manner which does not alter the charge image until it has reached the developing station where a toner is applied to produce a permanent visible image.

The principle feature of the invention accordingly is the provision of an electrostatic facsimile printer in flatbed configuration which is arranged to form a highly accurate charge image replica of the facsimile signals by virtue of the accuracy of the mechanical alignment obtained on repetitive scans and the electrode structure forming a precise movable charge-forming zone relative to the surface of the record sheet and the arrangements which permit the highly accurate charge image so formed to be preserved until it is rendered visible by electrostatic development.

DESCRIPTION OF THE PREFERRED EMBODIMENT

Figures 1, 2:
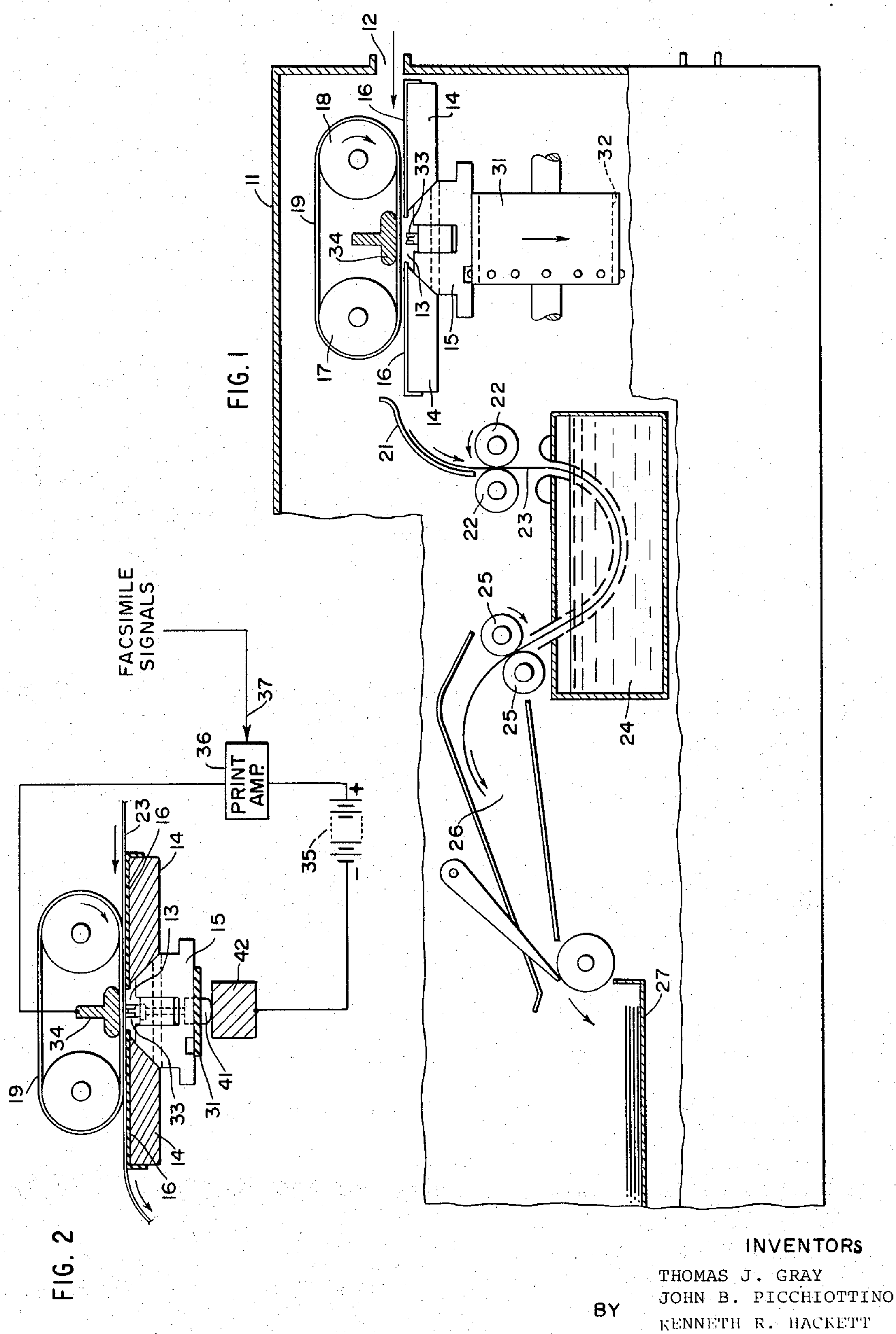
FIG. 1 is a partial side elevation view partly in section showing the principle elements of a facsimile printer constructed in accordance with the invention.
FIG. 2 is a detailed view partly in section and partly schematic showing the system for producing charge images in accordance with facsimile signals.

Referring now to FIG. 1, the facsimile printer is shown having an exterior housing 11 with an entrance slot 12 for feeding a record sheet, not shown, past a scan line station 13. The record sheet is supported on flatbed members 14 which are spaced to form the slot 13 and shaped to provide a tapered alignment guide for scanning heat 15. The top surface of the guides 14 is covered with a layer of high dielectric strength material 16 which provides a smooth low friction support for the record sheet. One suitable material for the layer 16 is Teflon which can be applied to the members 14 by means of an adhesive such as pressure adhesive backed Teflon tape.

The record sheet is driven over the non-conducting surfaces 16 of the support members 14 by a drive roll means consisting of rolls 17 and 18 upon which is tensioned an endless belt 19. The rolls 17 and 18 and the belt 19 extend for the full length of the scan line slot 13 and are positioned to form an extended nip with the surfaces 16 such that when the belt 19 is driven by one of the rolls 17 or 18 the record sheet is gripped and advanced across the slot 13 at the speed of movement of the belt 19.

A record sheet emerging from the nip formed between the belt 19 and the surfaces 16 is deflected by a guide 21 into a nip formed by rolls 22 which rolls have a good dielectric surface such as rubber and are driven to engage record sheet 23 and advance it through a liquid toner bath 24. The record sheet emerges from the toner bath 24 and is driven by a pair of rolls 25 into a drying chamber 26 from which completed copies emerge and are deposited in a receptacle 27.

The scan head 15 is mounted on an endless belt 31 driven over spaced sprocket pulleys 32 to move the scan head 15 in the aligning slot formed by the tapered edges of the members 14. Mounted on the scan head 15 is a print stylus 33 which will be described in detail hereinafter. In accordance with well known facsimile practice the speed of the drive for belt 19 to advance the record sheet and the speed of rotation of the pulleys 32 to move the scan head 15 in the slot 13 are coordinated and synchronized with the remote transmitter to provide the desired reconstruction of the image on line by line scan basis and as shown in the present construction a substantially rectilinear motion provides the desired scan resolution for the full area of the record sheet.

Referring now to FIG. 2, the preferred arrangement for forming a charge image in accordance with the facsimile signals will be described. For this purpose a backup electrode 34 is positioned within the area enclosed by belt 19 and extends the full length of the slot 13. The face of the backup electrode 34 also bridges the width of the slot 13 and with the members 14 constructed of metal as indicated in FIG. 2, defines the edges of the slot 13 electrostatically and constitutes in effect an equipotential guard electrode relative to the central position of the stylus 33.

The conductive portion of the stylus 33 and the backup electrode 34 are connected in circuit with a source of high potential 35 and a print amplifier 36 which is responsive to facsimile input signals on line 37. The amplifier 36 operates to apply the high potential of source 35 across the record sheet 23 as it passes over the slot 13 whenever it is desired to form a charge on the surface of the record sheet 23. This charge formation normally corresponds to the black portion of the image if a positive working toner is applied which will be attracted to the charged area. As is well known in xerography various combinations of positive and negative toners and positive and negative charge images (in the optical sense) are possible. Thus the record sheer 23 could be initially charged uniformly and selectively discharged by the action of the stylus 33 corresponding to the usual practice in electrostatic photography (xerography). In the presently disclosed preferred embodiment however the record sheet 23 is initially neutrally charged (uncharged) and the selected charge image is applied by the action of the stylus 23 which charge image is eventually developed as a permanent visible image in the toner bath 24.

In order to make the charge-forming potential available to the moving stylus 33 a sliding contact 41 is provided on the scan head 15 in conductive connection with the stylus 33. Sliding contact 41 runs on a print bar 42 which extends the full length of the slot 13 as hereinafter described.

Figure 3:
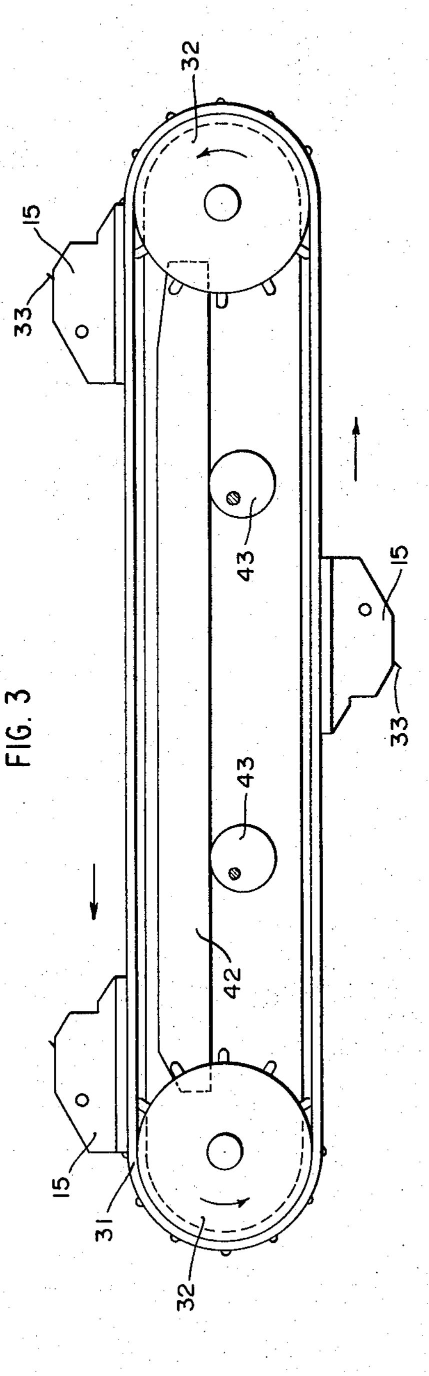
FIG. 3 is a front elevation view of the belt scanner portion of the machine shown in FIG. 1.

FIG. 3 shows a preferred arrangement of the belt 31 supporting three equidistantly spaced scans heads 15 thereon. Three scan heads on the belt 31 permit continuous recording of information since as each scan head reaches the end of the scan line a new scan head is positioned at the start of the next subsequent line spaced from the track of the previous scan head by the amount of paper advance occasioned by the drive speed of the belt 19 for the record sheet 23. As shown in FIG. 3 the spaced pulleys 32 support the belt 31 and tension it to assure a uniform driving force for the scanning heads 15 through the slot guide surfaces on the members 14. In order to provide for erection the styli into printing position the guide bar 42 is supported for vertical motion between two end positions the lower of which is shown in FIG. 3. For this purpose a set of cams 43 is provided which upon rotation elevate the guide bar 42 into contact with the sliding contact 41 on the scan heads 15 as hereinafter described.

Figure 4:
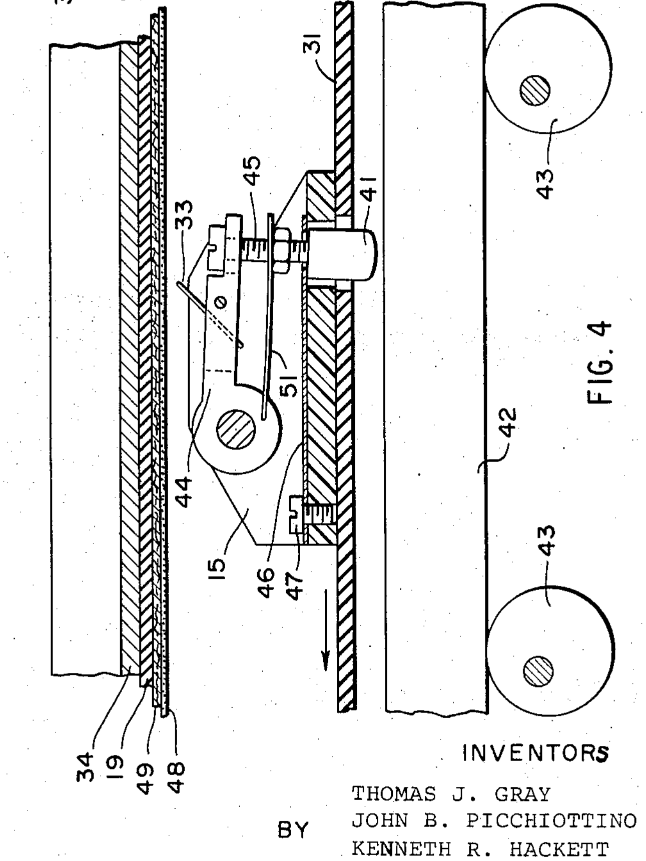

FIG. 4 shows a detail of the scan head construction and the members associated therewith in the machine. The scan head 15 comprises a light-weight body constructed of insulating material upon which is pivotally mounted a metallic arm 44 which supports the stylus 33. Projecting from the end of the arm 44 is an adjustment screw 45 to the end of which is mounted the sliding contact 41. THe sliding contact 41 is fixed to one end of a leaf spring 46, the other end of which is fastened by screw 47 to the base of the scan head 15. The action of the leaf spring 46 urges the movable contact 41 into the position shown in FIG. 4 and thereby retracts the stylus 33 from contact with dielectric surface 48 of the record sheet 49. While it is contemplated that the device will work with any record sheet that has a high resistivity surface sufficient to support for a considerable time period an electrostatic charge image thereon, it is preferred to employ a specially coated paper sheet 49 having a surface resistance layer 48 made up of a coating such as employed in the zinc-oxide photo-responsive papers used in xerography. While the zinc-oxide component and its photo-electric properties are not required in the present invention is has been found that ordinary zinc-oxide coated paper in a so-called "binder plate" resistivity matrix is entirely suitable for the present operation since the absence of light which would adversely effect the image is a condition that exists within the casing 11 of the facsimile printer. Other suitable high resistivity surface papers can be used.

As indicated in FIG. 4, the paper 49 is in contact with the moving belt 19 which in turn is in contact with the flanged surface of back support 34 thereby providing a continuous electrode surface opposite the stylus 33 as it scans. As described with reference to FIG. 3, the print bar 42 is shown in its retracted position as determined by cams 43.

Figure 5:
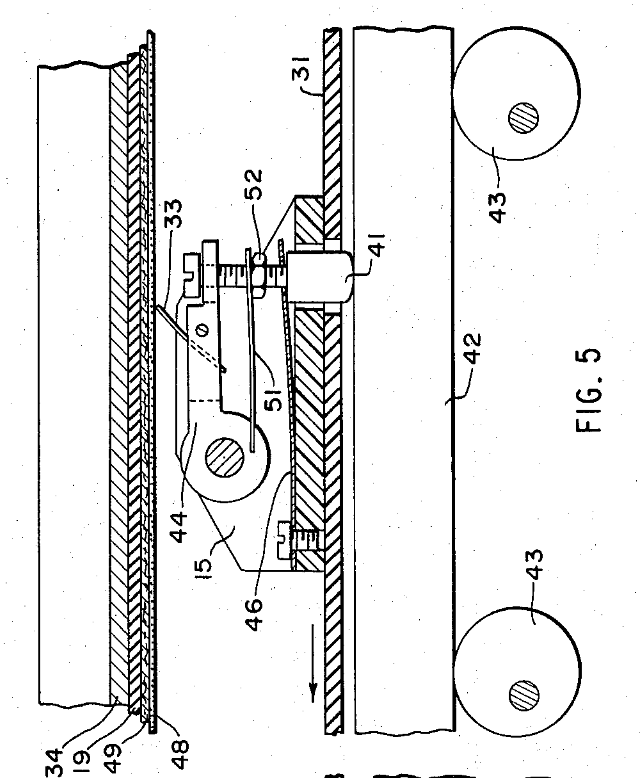
FIGS. 4 and 5 are detailed views showing the arrangement for elevating the scanning stylus into charge forming position in contact with the record sheet.

FIG. 5 shows that the stylus 33 as elevated to operative position in contact with the dielectric surface 48. This position is achieved by rotation of cams 43 to elevate print bar 42 and deflect sliding electrode 41 against the force of leaf spring 46 an amount sufficient to slightly flex the stylus 33 against the surface 48. In this position the stylus bears with a spring-loaded pressure determined by an additional leaf spring 51, the tension of which is set by the position of the nut 52. With this arrangement the stylus 33 is able to deflect the ride over any irregularities in the surface 48 by virtue of rotation of the member 44 against the flexing pressure of leaf spring 51 which is a weaker spring than leaf spring 46.

Figure 6:
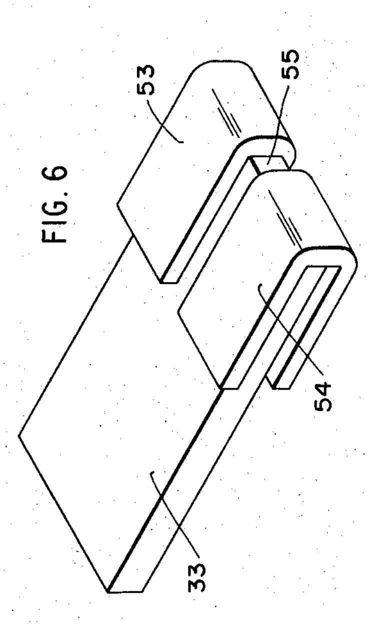
FIG. 6 is a perspective view of one form of stylus.
Figure 8:
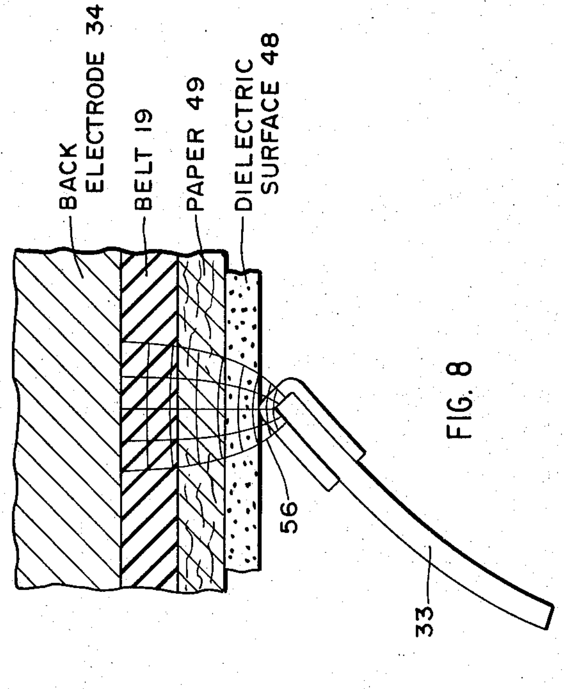
FIG. 8 is a view illustrating the stylus of FIG. 6 in operation relative to a record sheet and a backup electrode.

Referring now to FIG. 6, one form of stylus suitable for use in the invention is shown to comprise a thin metallic leaf spring made of a suitable material such as beryllium copper or phospher bronze and extremely thin to provide flexing with slight pressure. Over the end of the stylus which is to contact the paper an insulating tape is applied at 53 and 54 to cover the edges thereof while leaving an exposed edge 55 of the leaf spring material in the center. With this arrangement the tape sections 53 and 54 which may be Delrin or Teflon or other wear-resistant low-friction surface tapes serve to space the actual exposed metal portion 55 from the surface of the dielectric sheet. The operation of the stylus 33 to form with back electrode 34 a charge forming electrode system is described in an approximate matter as shown in FIG. 8. The stylus 33 is flexed against the dielectric surface 48 as previously described and when the high voltage is applied between the metallic electrode 33 and the metallic back electrode 34 in this configuration an electric field is established, the gradient of which is a maximum at the exposed surface 55 directly opposite the dielectric 48 as indicated by the flux plot contours 56. When the voltage is high enough this electrode system will cause charge carriers to be deposited on dielectric surface 48 with a geometrical accuracy well within the resolution desired for the system which for a scanning speed of stylus 33 of approximately 40 inches per second and 100 lines per inch resolution gives an overall dot resolution of approximately one one-hundredth of an inch diameter or better.

Figure 7:
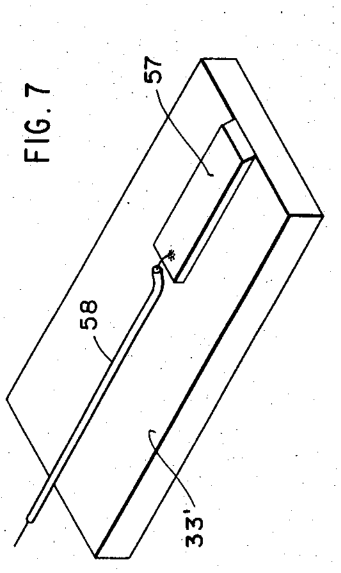
FIG. 7 is a perspective view of another form of stylus.
Figure 9:
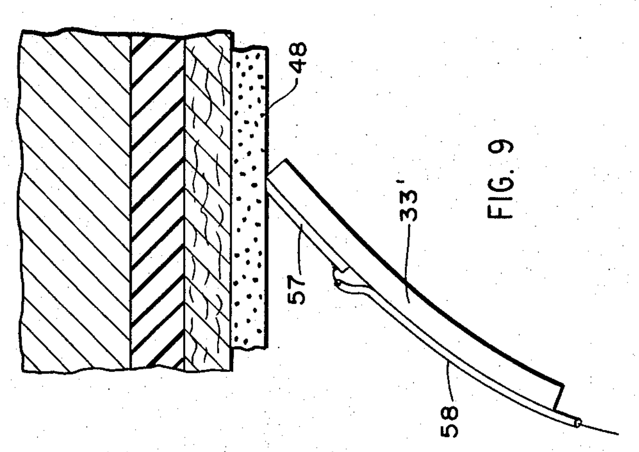
FIG. 9 is a view similar to FIG. 8 showing the stylus of FIG. 7.

FIG. 7 shows an alternate form of stylus 33' in which the body is made of flexible dielectric materials such as an acrylic which has high dielectric strength and high resistivity. To this plastic version of the leaf spring 33' a small strip of metal 57 is attached by a suitable adhesive and a fine wire connection 58 is made thereto for the purpose of applying voltage to the metal strip 57. The operation of the stylus 33' is substantially the same as that previously described except that, as shown, the metal strip 57 is in direct contact with the dielectric surface 48. As indicated the metal 57 generally will be worn smooth and make a non-abrading contact with the surface 48.

The operation of the disclosed embodiment of the present invention will now be obvious in light of the foregoing description. Certain details of the disclosure may also be changed without departing from the scope of the invention. For example, the liquid toner bath 24 shown in FIG. 1 is generally of the type used in office copying machines which employ zinc-oxide paper. Arrangements of this kind which provide for toning the electrostatic charge image without distorting or otherwise dissipating the charge are well known and other such versions thereof could be employed. The exact scanning and backup electrode structure shown in the present invention disclosure provides for the generation of the charge image in a relatively charge-fee environment of the slot 13 as provided by the guides 14 which provide an element of shielding from frictional electrostatic charges which may be associated with the rotating belt 31. The preservation of this charge image without distortion as it travels over the dielectric surface 16 is also enhanced by the relatively uniform ground plane provided by the metal of the underlying members 14. For this purpose the elements of the machine are generally at ground potential except for the print bar and stylus 33 which are elevated to approximately 1,000 volts by the application of print signals from the print amplifier 36. Where a negative charge is applied as indicated in FIG. 2 a negative attracted toner will be employed to produce a positive image.

What is claimed is:

1. An electrostatic facsimile printer comprising:

a bed plate having a slot therein and a non-conducting surface for contacting a dielectric surface record sheet as it passes over said plate;

drive roll means for transporting record sheets across said bed plate and said slot and including a conductive electrode opposed to and extending along the length of said slot on one side of said bed plate;

a pair of spaced pulleys mounted for rotation on the other side of said bed plate with an endless belt thereon movable along the length of said slot as said pulleys rotate;

at least one conductive stylus mounted on said belt and driven thereby in guided relation to said bed plate to traverse said slot with substantially rectilinear motion to define with said conductive electrode a moving elemental area electrostatic charge concentration electrode system;

means for rotating said drive roll means and said spaced pulleys in timed relation and in synchronism with a remote transmitter respectively to advance across said slot a record sheet inserted in said drive roll means and to scan said stylus repeatedly along said slot thereby scanning line by line the area of said record sheet with approximately 100 line per inch resolution;

means coupling facsimile signals received from said remote transmitter to apply corresponding charge producing voltage across said electrode system for forming line by line an invisible charge image on the dielectric surface of a record sheet between said stylus and said conductive electrode, said invisible charge image forming on successive scans a synthesized invisible charge image corresponding to the image on said original document with a line resolution of approximately 100 lines per inch;

an electrostatic developing station positioned to receive said record sheet as it emerges from said bed plate; and means for directing said record sheet with said synthesized charge image intact to said electrostatic developing station for producing a permanent visible image on said dielectric surface;

said stylus comprising a metal flat leaf spring electrode member mounted on said belt to project with a trailing angle toward said dielectric surface of said record sheet, and a wear-resistant, low-friction dielectric material covering the projecting end edge of said metal electrode member except for a central portion where the metal is exposed, said dielectric material being positioned to contact said dielectric surface when said electrode system is conditioned to produce charge images and spacing said exposed portion of said metal electrode member from said dielectric surface by the thickness of said dielectric material, whereby the end of said stylus in contact with said dielectric surface of said record sheet is resistant to wear, friction between said stylus end and said record sheet is low and the electrode member of said stylus is spaced from said record sheet.

2. An electrostatic facsimile printer comprising:

a bed plate having a slot therein and a non-conducting surface for contacting a dielectric surface record sheet as it passes over said plate;

drive roll means for transporting record sheets across said bed plate and said slot and including a conductive electrode opposed to and extending along the length of said slot on one side of said bed plate;

a pair of spaced pulleys mounted for rotation on the other side of said bed plate with an endless belt thereon movable along the length of said slot as said pulleys rotate;

at least one conductive stylus mounted on said belt and driven thereby in guided relation to said bed plate to traverse said slot with substantially rectilinear motion to define with said conductive electrode a moving elemental area electrostatic charge concentration electrode system;

means for rotating said drive roll means and said spaced pulleys in timed relation and in synchronism with a remote transmitter respectively to advance across said slot a record sheet inserted in said drive roll means and to scan said stylus repeatedly along said slot thereby scanning line by line the area of said record sheet with approximately 100 line per inch resolution;

means coupling facsimile signals received from said remote transmitter to apply corresponding charge producing voltage across said electrode system for forming line by line an invisible charge image on the dielectric surface of a record sheet between said stylus and said conductive electrode, said invisible charge image forming on successive scans a synthesized invisible charge image corresponding to the image on said original document with a line resolution of approximately 100 lines per inch;

an electrostatic developing station positioned to receive said record sheet as it emerges from said bed plate;

means for directing said record sheet with said synthesized charge image intact to said electrostatic developing station for producing a permanent visible image on said dielectric surface;

said stylus comprising a flat leaf spring insulator member mounted on said belt to project with a trailing angle toward said dielectric surface of said record sheet, and a metal electrode strip mounted on said insulator, said metal strip being narrower than said insulator member, extending to the edge of said insulator member and in contact with said dielectric surface at said edge.

* * * * *